(12) United States Patent
Jiang et al.

(10) Patent No.: US 9,702,639 B2
(45) Date of Patent: Jul. 11, 2017

(54) EXTERNAL FAN STACK BRACING APPARATUS AND METHOD

(71) Applicant: SPX COOLING TECHNOLOGIES, INC., Overland Park, KS (US)

(72) Inventors: Hongjun Jiang, Leawood, KS (US); Larry F. Burdick, Olathe, KS (US)

(73) Assignee: SPX COOLING TECHNOLOGIES, INC., Overland Park, KS (US)

( * ) Notice: Subject to any disclaimer, the term of this patent is extended or adjusted under 35 U.S.C. 154(b) by 79 days.

(21) Appl. No.: 14/817,766

(22) Filed: Aug. 4, 2015

(65) Prior Publication Data

US 2017/0038161 A1 Feb. 9, 2017

(51) Int. Cl.
*F28C 1/00* (2006.01)
*B01F 3/04* (2006.01)
*F28F 9/007* (2006.01)

(52) U.S. Cl.
CPC ............. *F28F 9/007* (2013.01); *B01F 3/04* (2013.01); *F28C 1/00* (2013.01)

(58) Field of Classification Search
CPC ...................................... B01F 3/04; F28C 1/00
USPC ................................................... 261/DIG. 11
See application file for complete search history.

(56) References Cited

U.S. PATENT DOCUMENTS 2,814,435 A * 11/1957 Fordyce .................... F28C 1/00
138/39

* cited by examiner

*Primary Examiner* — Robert A Hopkins
(74) *Attorney, Agent, or Firm* — Baker and Hostetler LLP

(57) ABSTRACT

The present invention relates to a fan cylinder bracing system for a cooling tower having a fan deck that extends along a longitudinal axis. The bracing system has a first ring having a first diameter wherein the first ring is located at a first position along the longitudinal axis. It also has a second ring having a second diameter wherein the second ring is located at a second position along the longitudinal axis. Finally, the cylinder bracing system has a first brace connected to the first ring and said second ring, wherein said first brace transfers loads from the first ring to the second ring.

18 Claims, 5 Drawing Sheets

EXTERNAL FAN STACK BRACING APPARATUS AND METHOD

FIELD OF THE INVENTION

The present invention relates to a mechanical draft cooling tower or the like. The aforementioned cooling tower operates by mechanical draft and achieves the exchange of heat between two fluids such as atmospheric air, ordinarily, and another fluid which is usually water, steam or an industrial process fluid or the like. The cooling tower employs an external fan stack or cylinder that functions to discharge and guide hot exhaust air to a position above the cooling tower. In certain extreme atmospheric conditions or events, additional external supports are employed and/or required to assist the tower in withstanding such conditions. Accordingly, the present invention provides an external fan stack or cylinder bracing system for cooling towers utilized in extreme atmospheric conditions.

BACKGROUND OF THE INVENTION

Cooling towers are heat exchangers of a type widely used to emanate low grade heat to the atmosphere and are typically utilized in electricity generation, air conditioning installations and the like. In a mechanical draft cooling tower for the aforementioned applications, airflow is induced or forced via an air flow generator such as a driven impeller, driven fan or the like. Cooling towers may be wet or dry. Dry cooling towers can be either "direct dry," in which steam is directly condensed by air passing over a heat exchange medium containing the steam or an "indirect dry" type cooling towers, in which the steam first passes through a surface condenser cooled by a fluid and this warmed fluid is sent to a cooling tower heat exchanger where the fluid remains isolated from the air, similar to an automobile radiator. Dry cooling has the advantage of no evaporative water losses. Both types of dry cooling towers dissipate heat by conduction and convection and both types are presently in use. Wet cooling towers provide direct air contact to a fluid being cooled. Wet cooling towers benefit from the latent heat of vaporization which provides for very efficient heat transfer but at the expense of evaporating a small percentage of the circulating fluid.

In order to accomplish the required cooling, large industrial sized induced draft water cooling towers of either the crossflow or counterflow variety employ velocity head recovery stacks or external fan stacks or cylinders which are mounted in circumscribing relationship to the powered fan(s) associated with the towers and extend upwardly therefrom. The purpose of such stacks or cylinders is twofold. First, such stacks serve to discharge and guide hot exhaust air to a position above the tower where it diffuses into the ambient atmosphere and is carried away from the cool air inlet of the tower by the prevailing winds for example. It is necessary to discharge hot discharge air at an elevation where recirculation of such air back through the cool air inlets of the tower is prevented, since recirculation measurably lowers cooling efficiency. Second, stacks lessen fan horsepower requirements by virtue of "recovery" of pressure of air discharged therethrough, such occurring because of the diverging contour of the stacks.

Such external fan stacks are generally configured with a venturi-like restriction intermediate the ends thereof that surround the fan blade. They typically have a divergent upper discharge section above the fan blade in which reduction in air velocity and partial recovery of pressure occurs.

As noted, such a stack configuration serves to lessen fan power requirements, and in large towers the savings can be significant.

The aforementioned fan stacks have drawbacks however. Said stacks are subject to the environmental elements such as high wind shear or wind load due to hurricanes for example, and thus can oftentimes require some sort of reinforcement or bracing to reduce the likelihood of fan cylinder and mechanical equipment damage. Current reinforcement or bracing systems utilized in the art have drawbacks as they can rupture the tower fan deck and/or fan stack at the respective attachment points in high wind conditions, causing more damage to the tower.

Accordingly, it is desirable to provide a cooling tower external stack support or bracing system that offers the requisite support during extreme environmental conditions while minimizing the risk of further damaging the cooling tower structure. The present invention addresses this desire.

SUMMARY OF THE INVENTION

Embodiments of the present invention advantageously provides for an external fan stack bracing system for a cooling tower or the like.

In one embodiment of the present invention, a fan cylinder bracing system for a cooling tower having a fan deck that extends along a longitudinal axis is disclosed, the fan cylinder comprising: a first ring having a first diameter wherein said first ring is located at a first position along the longitudinal axis; a second ring having a second diameter wherein said second ring is located at a second position along the longitudinal axis; and a first brace connected to said first ring and said second ring, wherein said first brace transfers loads from said first ring to said second ring.

In another embodiment of the present invention, a cooling tower is provided, comprising: a fan deck; an external fan stack extending from said fan deck along a longitudinal axis; and a fan stack bracing system, comprising: a first ring having a first diameter wherein said first ring is located at a first position along the longitudinal axis; a second ring having a second diameter wherein said second ring is located at a second position along the longitudinal axis; and a first brace connected to said first ring and said second ring, wherein said first brace transfers loads from said first ring to said second ring.

In yet another embodiment of the present invention, a method for bracing an external fan cylinder is provided, comprising: supporting the fan cylinder using a first ring having a first diameter wherein said first ring is located at a first position along the longitudinal axis and is attached to the fan cylinder; a second ring having a second diameter wherein said second ring is located at a second position along the longitudinal axis; and transferring support loads from the first ring to the second ring via a brace connected to said first ring and said second ring.

In still another embodiment of the present invention, a fan cylinder bracing system for a cooling tower having a fan deck that extends along a longitudinal axis is provided, comprising: means supporting the fan cylinder using a first ring having a first diameter wherein said first ring is located at a first position along the longitudinal axis and is attached to the fan cylinder; a second ring having a second diameter wherein said second ring is located at a second position along the longitudinal axis; and means for transferring support loads from the first ring to the second ring via a brace connected to said first ring and said second ring.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical and processing changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Figure 1:
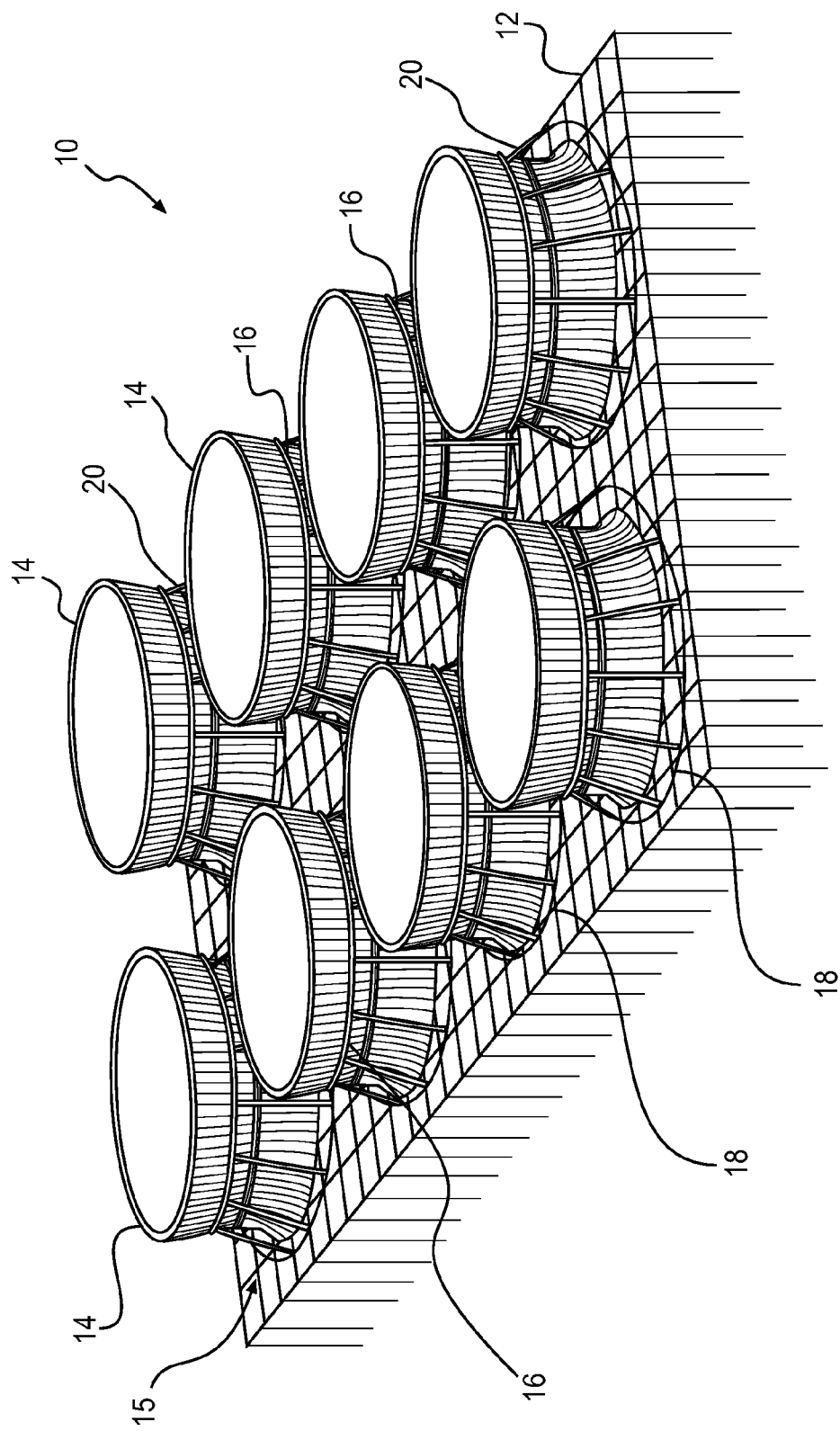
FIG. 1 is an isometric view of a cooling tower frame structure having multiple external fan cylinders or stacks in accordance with an embodiment of the present invention.

Turning now to FIG. 1, a cooling tower frame assembly, generally designated 10, is illustrated. As depicted in FIG. 1, the cooling tower frame assembly 10 employs a series of external fan cylinders or stacks 14 supported on a fan deck 12. Each of the external fan cylinders or stacks 14 is connected and attached to the fan deck 12 via a fan deck reinforcement piece (not pictured). Each of the external fan cylinders or stacks 14 is encircled and supported by a bracing system, generally designated 15 which will be discussed in further detail below.

Figure 2:
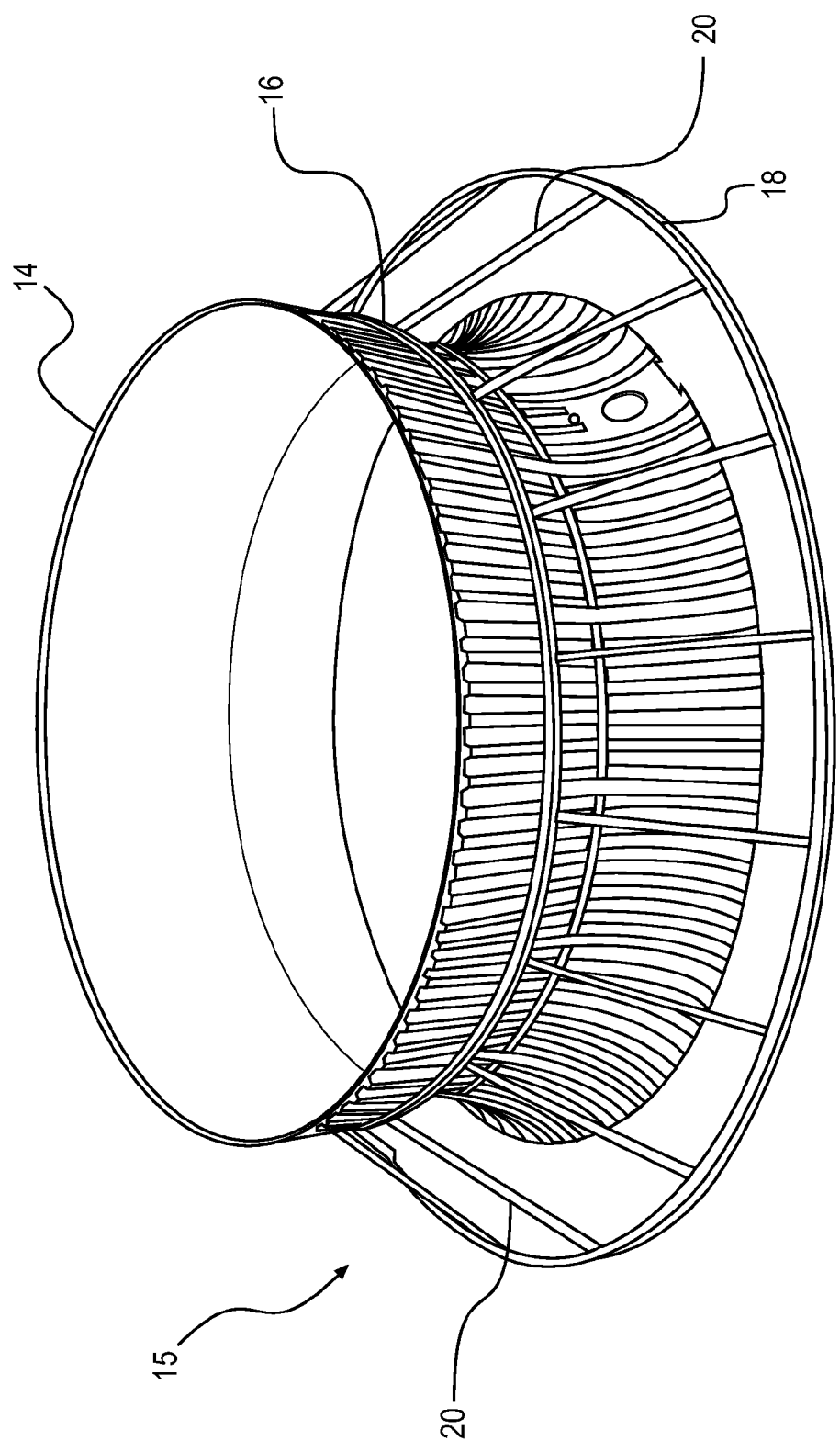
FIG. 2 an isometric view of an external fan cylinder or stack with a bracing system in accordance with an embodiment of the present invention.
Figure 3:
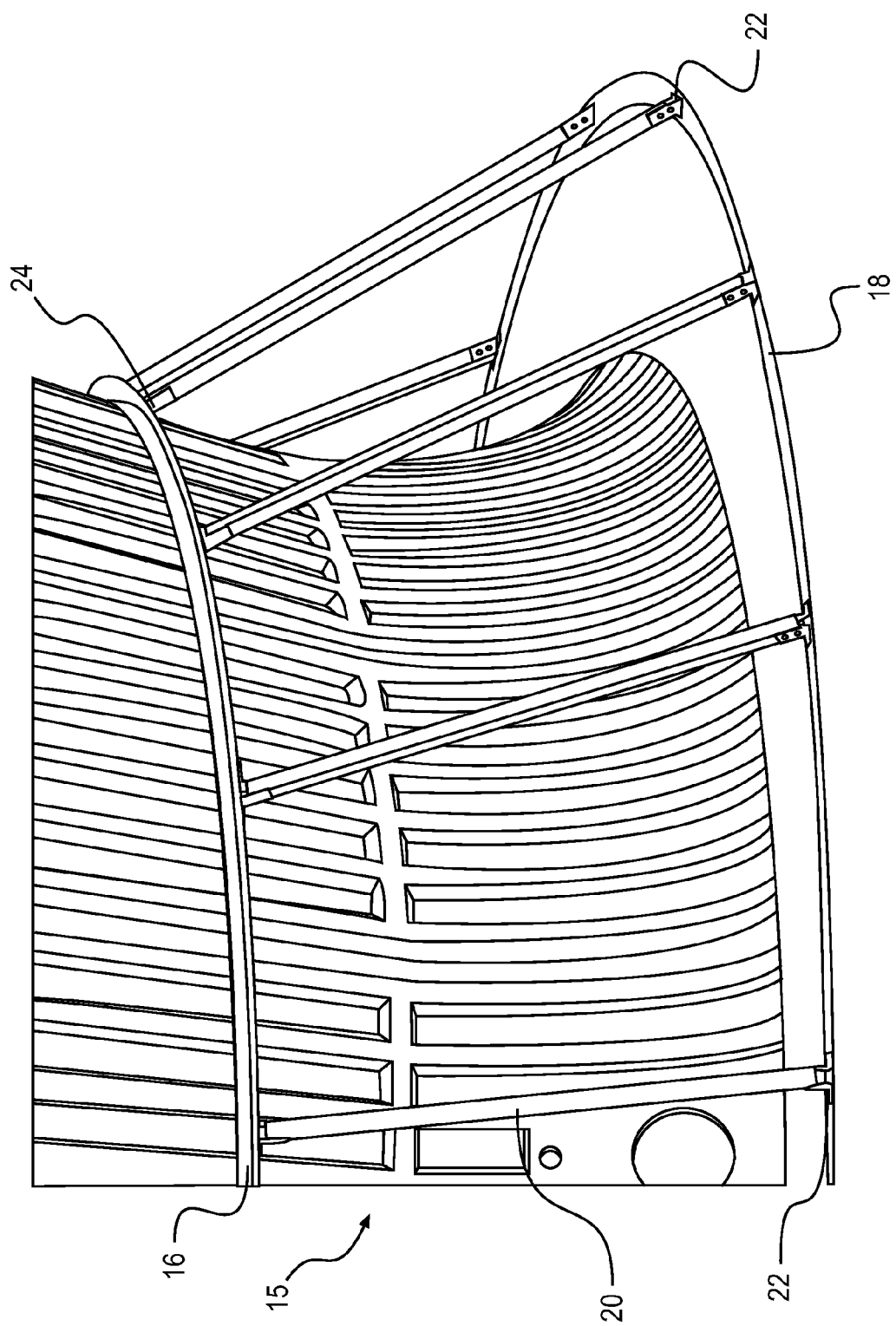
FIG. 3 is a isometric view of a of the bracing system depicted in FIG. 2 in accordance with an embodiment of the present invention.
Figure 4:
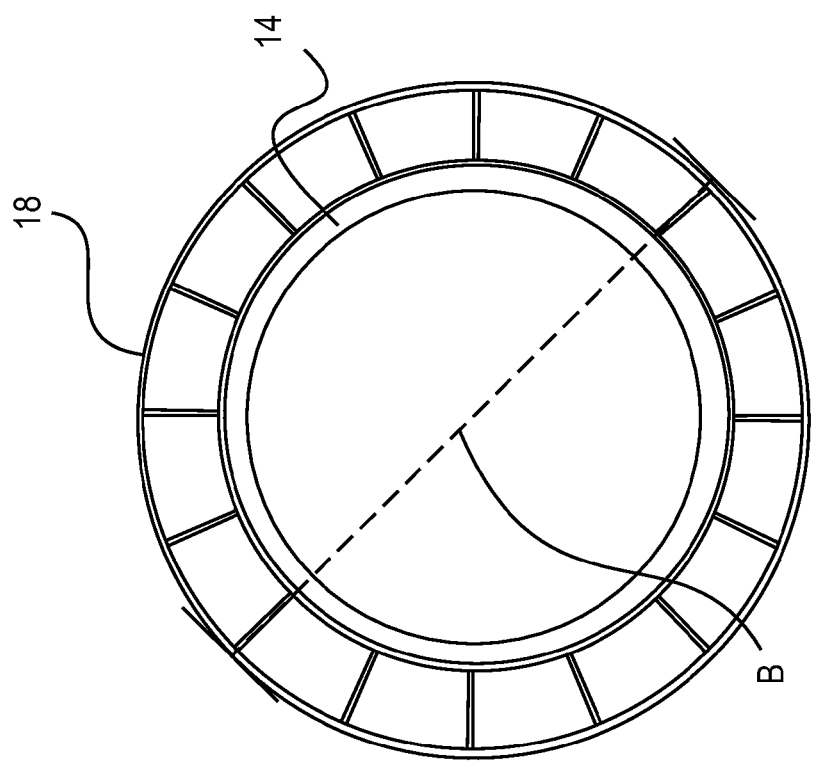
FIG. 4 is a plan view of a cooling tower frame structure having multiple external fan cylinders or stacks in accordance with an embodiment of the present invention.
Figure 4:
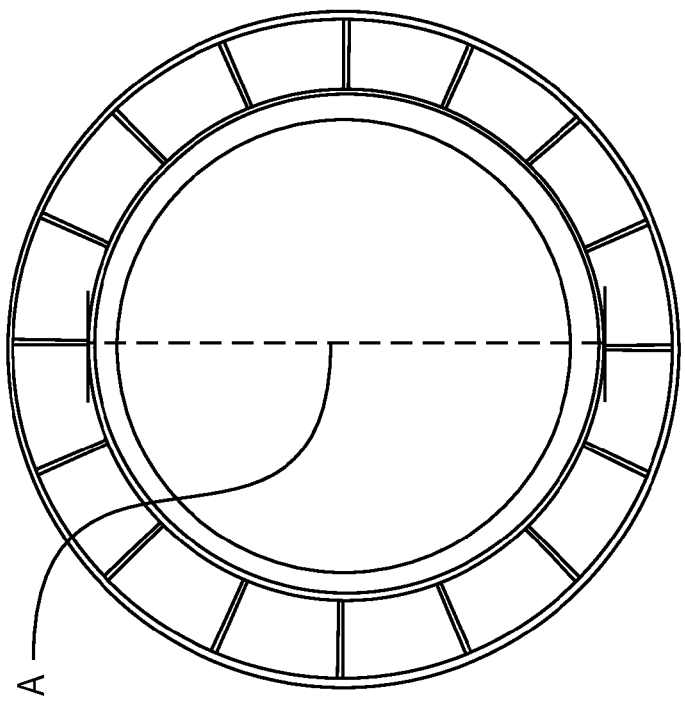

Referring now to FIGS. 1-3, the bracing system 15 is illustrated in detail. The bracing system 15 comprises an upper, stiffener ring 16 that is attached to the upper area or the "belly" of the external fan cylinders or stacks 14. The stiffener ring 16 functions to maintain the roundness or geometry of the external fan cylinders or stacks 14 during conditions of high wind load for example, and prevents the likelihood of the external fan cylinders or stacks 14 from deforming from such conditions. The bracing system 15 also includes a lower, fan deck ring 18. As the name suggests, the fan deck ring 18 is located on top of, and attached to, the fan deck 12. It functions distribute loads equally from the bracing system 15 to the tower structure 10. Finally, the bracing system 15 also employs or includes a series of braces 20 that span between the stiffener rings 16 and the fan deck rings 18. The braces 20 are connected to each of the stiffener ring 16 and the fan deck ring 18 via mechanical attachment 24 and 22 respectively, for example brackets, bolts, screw attachment or the like. The braces 20 function to transfer the loads the stiffener ring 16 is experiencing to the fan deck ring 18.

In one embodiment of the present invention, each of the stiffener ring 16 and the fan deck ring 18 may be constructed of rolled steel. In such embodiments, the stiffener ring 16 and fan deck ring 18 each have angles L4×4×0.25 that are constructed in sections and spliced with rolled angles L3×3× 3/8. While in one embodiment, the rings 16, 18 are constructed of rolled steel, said rings 16, 18 can be constructed of various materials depending upon the application such as plastics, metals, galvanized steel or the like. In one embodiment, the upper stiffener ring 16 is preferably angled such that a bearing surface is engaged against the fan cylinder or stack 14 while being angled to facilitate attachment to the struts or braces 20. While the lower, fan deck ring 18 may not have an angled orientation in certain embodiments, it may be angled depending upon the cooling tower and/or fan stack design.

Figure 6:
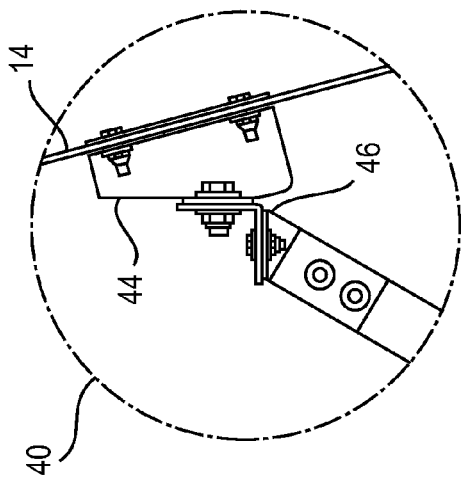
FIG. 6 is a detailed view of an attachment connection of a bracing system in accordance with an embodiment of the present invention.
Figure 7:
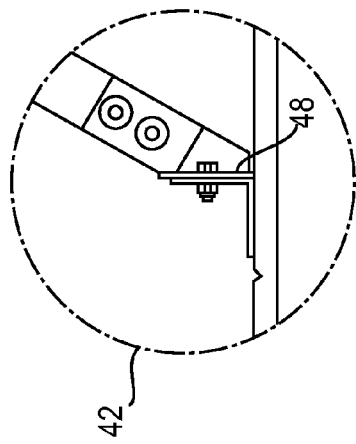
FIG. 7 is another detailed view of an attachment connection of a bracing system in accordance with an embodiment of the present invention.
Figure 5:
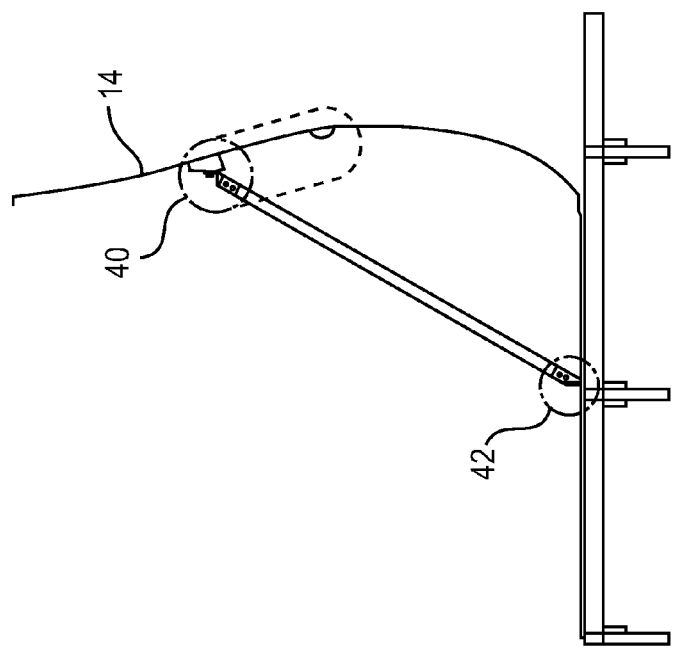
FIG. 5 is a partial side view of a fan cylinder segment having a bracing system in accordance with an embodiment of the present invention.

Turning now to FIGS. 5-7, a partial fan stack or cylinder 14 and the bracing system 15 in accordance with an embodiment of the present invention. As depicted in detail in FIG. 5, a strut or brace 20 of the bracing system 15 is extending from fan deck 12 and fan deck ring 18 to the upper, stiffener ring 16. The strut or brace is connected to the upper ring 16 by an upper connection, generally designated 40, and to the fan deck ring 18 via a lower connection, generally designated 42.

Turning specifically to FIG. 6, the upper connection 40 is illustrated. The upper connection comprises a brace 46, for example an angled support or the like that attaches to the upper ring 16 and the strut 20. Bracket 44 connects upper stiffener ring 16 to fan cylinder or stack 14. Turning to FIG. 7, the lower connection 42 is illustrated. The lower connection 42 comprises a brace or deck angle support 48 or the like that attaches to the lower deck ring 18 and the strut 20.

In one embodiment of the present invention, the upper, stiffener ring 16 has a first diameter A and the lower, fan deck ring 18 has a second diameter B wherein the stiffener ring 16 diameter is typically smaller than the fan deck ring 18 diameter. The respective diameters however of the above-described rings 16, 18 may vary in size from one another, or alternatively, equal. In fact upper stiffener ring 16 could be larger in diameter than fan deck ring 18 if the fan cylinder or stack 14 is a simple inverted truncated cone shape or the other shape that does not have a lower portion converging to a smaller diameter above the fan deck. The type of towers and applications in which the rings are utilized can ultimately dictate the diameter of each ring needed along with the tower size and configuration of said tower stack being supported.

In such embodiments the braces or struts 20 may be pultruded tubes having a size of 3×3×1/4. The braces or struts 20, like the rings 16, 18, may be constructed from varying metals, plastics such as galvanized steel, rolled steel or the like. Moreover, the bracing system 10 may use a plurality of struts or braces 20 as needed or required by the specific application and the size and geometric of the external stack of the cooling tower.

During operation, the bracing system 15 reinforces the external fan cylinders or stacks 14 on top of a cooling tower or the like, and can provide wind load resistance up to 300 kph. During operation, it encircles the external fan cylinders or stacks 14 of a cooling tower to help the external fan cylinders or stacks 14 maintain their shape and geometry and keep the respective external fan cylinders or stacks 14 attached to the cooling tower during extreme weather events. More specifically, the upper, stiffener ring 16 encircles the upper area or belly of the external fan cylinders or stacks 14. Due to this orientation, the upper, stiffener ring 16 functions to spread the loads the external fan cylinders or stacks 14 about said ring 16 which in turn applies loads to braces 20, reducing the likelihood of the external fan cylinders or stacks 14 and/or the internal components being punctured or damaged.

Bracing system 15 intercepts loads on external fan cylinder or stack 14 with ring 16 preventing external fan cylinder or stack from being relied upon to carry the entire load. Braces 20 transmit the loads to fan deck ring 18 which in turn further spreads the load to the structural members in the fan deck and into cooling tower frame assembly 10. This has the additional benefit of not overloading the fan deck structural members directly under fan cylinders or stacks 14. Thus the load redistribution accomplished by bracing system 15 prevents the likelihood of the fan cylinders or stacks 14 from suffering damage during extreme weather conditions.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, for example a forced draft air cooled condenser has been illustrated but an induced draft design can be adapted to gain the same benefits and, accordingly, all suitable modifications and equivalents may be resorted to that fall within the scope of the invention.

What is claimed is:

1. A fan cylinder bracing system for a cooling tower having a fan stack that extends along a longitudinal axis from a fan deck, comprising:
    a first ring having a first diameter wherein said first ring is attached to the fan stack and is located at a first position along the longitudinal axis;
    a second ring having a second diameter wherein said second ring is located at a second position along the longitudinal axis, wherein said second ring is attached to the fan deck only at a distance away from the fan stack; and
    a first brace connected to said first ring and said second ring, wherein said first brace transfers loads from said first ring to said second ring.

2. The fan stack bracing system according to claim 1, wherein said first ring encircles the fan stack.

3. The fan stack bracing system according to claim 1, wherein said second diameter is greater than said first diameter.

4. The fan stack bracing system according to claim 1, further comprising a second brace connected to said first ring and said second ring, wherein said second brace transfers loads from said first ring to said second ring.

5. The fan stack bracing system according to claim 4, further comprising a third brace connected to said first ring and said second ring, wherein said third brace transfers loads from said first ring to said second ring.

6. The fan stack bracing system according to claim 5, further comprising a fourth brace connected to said first ring and said second ring, wherein said fourth brace transfers loads from said first ring to said second ring.

7. The fan stack bracing system according to claim 1, wherein said first ring is a stiffener ring and the second ring is a fan deck ring.

8. The fan stack bracing system according to claim 1, wherein said first position is located above said second position along the longitudinal axis.

9. A cooling tower, comprising:
    a fan deck;
    an external fan stack extending from said fan deck along a longitudinal axis; and
    a fan stack bracing system, comprising:
        a first ring having a first diameter wherein said first ring is attached to said fan stack and is located at a first position along the longitudinal axis;
        a second ring having a second diameter wherein said second ring is located at a second position along the longitudinal axis, wherein said second ring is attached to the fan deck only at a distance separating the attachment from said fan stack; and
        a first brace connected to said first ring and said second ring, wherein said first brace transfers loads from said first ring to said second ring.

10. The fan stack bracing system according to claim 9, wherein said first ring encircles the fan stack.

11. The fan stack bracing system according to claim 9, wherein said second diameter is greater than said first diameter.

12. The fan stack bracing system according to claim 9, further comprising a second brace connected to said first ring and said second ring, wherein said second brace transfers loads from said first ring to said second ring.

13. The fan stack bracing system according to claim 12, further comprising a third brace connected to said first ring and said second ring, wherein said third brace transfers loads from said first ring to said second ring.

14. The fan stack bracing system according to claim 13, further comprising a fourth brace connected to said first ring and said second ring, wherein said fourth brace transfers loads from said first ring to said second ring.

15. The fan stack bracing system according to claim 9, wherein said first ring is a stiffener ring and the second ring is a fan deck ring.

16. The fan stack bracing system according to claim 9, wherein said first position is located above said second position along the longitudinal axis.

17. A method for bracing an external fan cylinder, comprising:
supporting the fan cylinder using a first ring having a first diameter wherein said first ring is located at a first position along the longitudinal axis and is attached to the fan cylinder; a second ring having a second diameter wherein said second ring is located at a second position along the longitudinal axis, wherein said second ring is attached to a fan deck only at a distance away from the fan stack; and
transferring support loads from the first ring to the second ring via a brace connected to said first ring and said second ring.

18. A fan cylinder bracing system for a cooling tower having a fan deck that extends along a longitudinal axis, comprising:
means supporting the fan cylinder using a first ring having a first diameter wherein said first ring is located at a first position along the longitudinal axis and is attached to the fan cylinder; a second ring having a second diameter wherein said second ring is located at a second position along the longitudinal axis, wherein said second ring is attached to the fan deck only at a distance away from the fan stack; and
means for transferring support loads from the first ring to the second ring via a brace connected to said first ring and said second ring.

* * * * *